(12) United States Patent
Wakimoto et al.

(10) Patent No.: US 11,018,367 B2
(45) Date of Patent: May 25, 2021

(54) SECONDARY BATTERY AND BATTERY PACK INCLUDING THE SAME

(71) Applicant: SANYO Electric Co., Ltd., Daito (JP)

(72) Inventors: Ryoichi Wakimoto, Hyogo (JP); Yohei Muroya, Hyogo (JP); Hiroyuki Yamada, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 56 days.

(21) Appl. No.: 16/255,019

(22) Filed: Jan. 23, 2019

(65) Prior Publication Data

US 2019/0273277 A1  Sep. 5, 2019

(30) Foreign Application Priority Data

Mar. 2, 2018  (JP) .............................. JP2018-037101

(51) Int. Cl.
| | |
|---|---|
| *H01M 50/10* | (2021.01) |
| *H01M 50/102* | (2021.01) |
| *H01M 50/105* | (2021.01) |
| *H01M 50/107* | (2021.01) |
| *H01M 50/109* | (2021.01) |
| *H01M 50/11* | (2021.01) |
| *H01M 50/14* | (2021.01) |
| *H01M 50/141* | (2021.01) |
| *H01M 50/143* | (2021.01) |
| *H01M 50/145* | (2021.01) |
| *H01M 50/20* | (2021.01) |
| *H01M 50/553* | (2021.01) |
| *H01M 50/543* | (2021.01) |
| *H01M 50/296* | (2021.01) |

(Continued)

(52) U.S. Cl.
CPC ....... *H01M 10/04* (2013.01); *H01M 10/0525* (2013.01); *H01M 50/20* (2021.01); *H01M 50/502* (2021.01); *H01M 50/578* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 2013/0095372 A1 | 4/2013 | Kim et al. | |
| 2016/0181589 A1* | 6/2016 | Yokoyama | H01M 10/0431 429/61 |
| 2016/0336573 A1* | 11/2016 | Osanai | H01M 10/425 |

FOREIGN PATENT DOCUMENTS

| | | |
|---|---|---|
| JP | 2013-89592 A | 5/2013 |
| JP | 2016-119210 A | 6/2016 |

* cited by examiner

*Primary Examiner* — Yoshitoshi Takeuchi
(74) *Attorney, Agent, or Firm* — Westerman, Hattori, Daniels & Adrian, LLP

(57) ABSTRACT

Provided are a secondary battery and a battery pack including the secondary battery. A sealing plate has a positive electrode terminal attachment hole. A positive electrode terminal penetrates the positive electrode terminal attachment hole. An external conductive member is connected to a portion of the positive electrode terminal located on the battery outer side with respect to the sealing plate. The conduction path between a positive electrode plate and the positive electrode terminal is provided with a current interrupting mechanism. A first insulating member made of resin is disposed between the sealing plate and the positive electrode terminal. A second insulating member having higher thermal resistance than the first insulating member is disposed between the external conductive member and the sealing plate.

9 Claims, 7 Drawing Sheets

(51) Int. Cl.
*H01M 50/583* (2021.01)
*H01M 50/574* (2021.01)
*H01M 50/572* (2021.01)
*H01M 50/578* (2021.01)
*H01M 2/34* (2006.01)
*H01M 2/30* (2006.01)
*H01M 2/02* (2006.01)
*H01M 10/04* (2006.01)
*H01M 10/0525* (2010.01)
*H01M 50/502* (2021.01)

SECONDARY BATTERY AND BATTERY PACK INCLUDING THE SAME

CROSS REFERENCE TO RELATED APPLICATIONS

The present invention application claims priority to Japanese Patent Application No. 2018-037101 filed in the Japan Patent Office on Mar. 2, 2018, the entire contents of which are incorporated herein by reference.

BACKGROUND OF THE INVENTION

Field of the Invention

The present invention relates to a secondary battery and a battery pack including the secondary battery.

Description of Related Art

Non-aqueous electrolyte secondary batteries are used as driving power sources for electric vehicles (EVs) and hybrid electric vehicles (HEVs, PHEVs), and as stationary storage battery systems, for example, for use in reducing the output fluctuations of solar power, wind power, and other resources, and for use in peak shift of grid-connected power to store power at night and use it for daytime. These applications use secondary batteries connected in parallel.

For these secondary batteries, Japanese Published Unexamined Patent Application Nos. 2016-119210 and 2013-089592 (Patent Documents 1 and 2) disclose techniques for disposing a current interrupting mechanism or a fuse part in the conduction path between an electrode body and a terminal to improve reliability.

The current interrupting mechanism operates in response to an increase in the internal pressure of the battery case. The fuse part melts and breaks upon the flow of a large current.

BRIEF SUMMARY OF THE INVENTION

A secondary battery and a battery pack including the secondary battery need to have high reliability in case of a short circuit that may occur inside the secondary battery.

An object of the present invention is to provide a secondary battery having high reliability and a battery pack including the secondary battery.

A secondary battery in an aspect of the present invention includes an electrode body that includes a positive electrode plate and a negative electrode plate; an outer body that has an opening and houses the electrode body; a sealing plate that is made of metal and seals the opening; and a terminal that is electrically connected to the positive electrode plate or the negative electrode plate. The sealing plate has a terminal attachment hole. The terminal penetrates the terminal attachment hole. An external conductive member is connected to a portion of the terminal located on a battery outer side with respect to the sealing plate. A conduction path between the positive electrode plate or the negative electrode plate and the terminal is provided with at least one of a current interrupting mechanism and a fuse part. A first insulating member made of resin is disposed between the sealing plate and the terminal.

A second insulating member having higher thermal resistance than the first insulating member is disposed between the external conductive member and the sealing plate.

The inventors of the present invention have found that there is the following issue in a battery pack including secondary batteries that are connected in parallel and each have at least one of a current interrupting mechanism and a fuse part in a conduction path between the electrode body and the terminal.

In the case where secondary batteries are connected in parallel and a short circuit occurs between positive and negative electrodes in one secondary battery, a current flows into the secondary battery in which the short circuit has occurred from other secondary batteries connected in parallel. Thus, the secondary battery in which the short circuit has occurred in the case where secondary batteries are connected in parallel tends to become a higher-temperature state than that in the case where secondary batteries are not connected in parallel. When the secondary battery becomes a high-temperature state, the electrolyte decomposes to increase the pressure of gas in the battery case, and the current interrupting mechanism operates. Since the operation of the current interrupting mechanism causes disconnection of the conduction path between the electrode body and the terminal, the current flow from other secondary batteries into the secondary battery in which the short circuit has occurred is terminated.

In the case where secondary batteries each have a fuse part and a short circuit occurs between positive and negative electrodes in one secondary battery, the fuse part melts and breaks due to a short-circuit current to disconnect the conduction path between the electrode body and the terminal. Thus, the current flow from other secondary batteries into the secondary battery in which the short circuit has occurred is terminated.

However, even when the current flow from other secondary batteries into the secondary battery in which the short circuit has occurred is terminated, the chemical reaction inside the battery or the like may maintain the high-temperature state of the secondary battery in which the short circuit has occurred or may increase the temperature of the secondary battery in which the short circuit has occurred. In the case where the secondary battery becomes a high-temperature state, there is a possibility that an insulating member made of resin that insulates between the terminal and the sealing plate may melt. If an insulating member made of resin between a positive electrode terminal and the sealing plate and an insulating member made of resin between a negative electrode terminal and the sealing plate both melt, the positive electrode terminal and the negative electrode terminal are each electrically connected to the sealing plate. This forms a conduction path of positive electrode terminal-sealing plate-negative electrode terminal and thus forms a closed circuit between the secondary batteries connected in parallel. Then, a current flows in the secondary batteries connected in parallel, and a large current flows in the secondary batteries connected in parallel to the secondary battery in which the short circuit has occurred. As a result, an abnormal event may occur in the secondary batteries connected in parallel to the secondary battery in which the short circuit has occurred.

In the structure of the secondary battery in one aspect described above, the thermal resistance of the second insulating member connected to the terminal and disposed between the external conductive member and the sealing plate is higher than the thermal resistance of the first insulating member made of resin and disposed between the terminal and the sealing plate. Therefore, even if the secondary battery becomes a high-temperature state so that the first insulating member melts, the second insulating member can suppress a reduction in the distance between the sealing plate and the external conductive member connected to the terminal. The second insulating member can thus avoid the contact between the terminal and the sealing plate caused by movement of the terminal, which is connected to the external conductive member, toward the sealing plate. Therefore, even if a short circuit occurs inside one of the secondary batteries connected in parallel, occurrence of abnormal events in secondary batteries different from the secondary battery in which the short circuit has occurred can be effectively suppressed.

Here, the expression the thermal resistance of the second insulating member is higher than the thermal resistance of the first insulating member means that the highest temperature at which the second insulating member can keep the distance between the external conductive member and the sealing plate is higher than the highest temperature at which the first insulating member can keep the distance between the terminal and the sealing plate.

For example, the second insulating member may be composed of a material having a higher melting point than the material that constitutes the first insulating member.

The external conductive member can be a member to which a busbar that electrically connects secondary batteries to each other in the battery pack is connected. In this case, a bolt is connected to the conductive member so that the busbar can be fixed to the external conductive member through the bolt. The busbar may be weld-connected to the external conductive member. In this case, the bolt is not necessary.

The busbar that electrically connects secondary batteries to each other may serve an external conductive member.

The present invention can provide a secondary battery with high reliability and a battery pack including the secondary battery.

DETAILED DESCRIPTION OF THE INVENTION

Figure 1A:
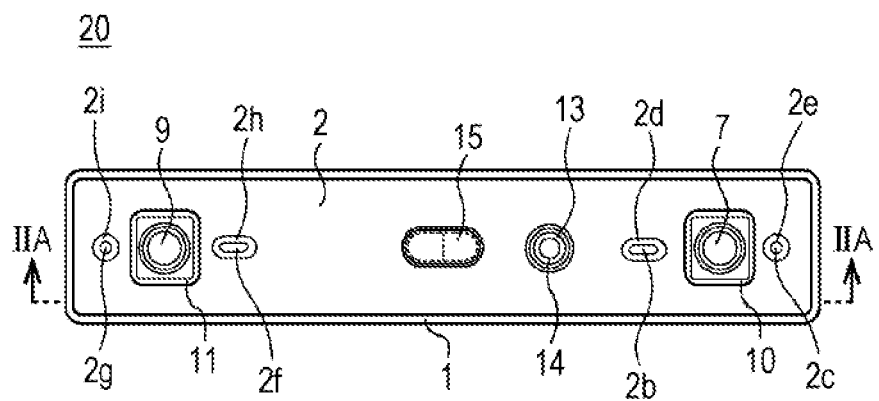
FIG. 1A is a top view of a prismatic secondary battery according to an embodiment.
Figure 1B:
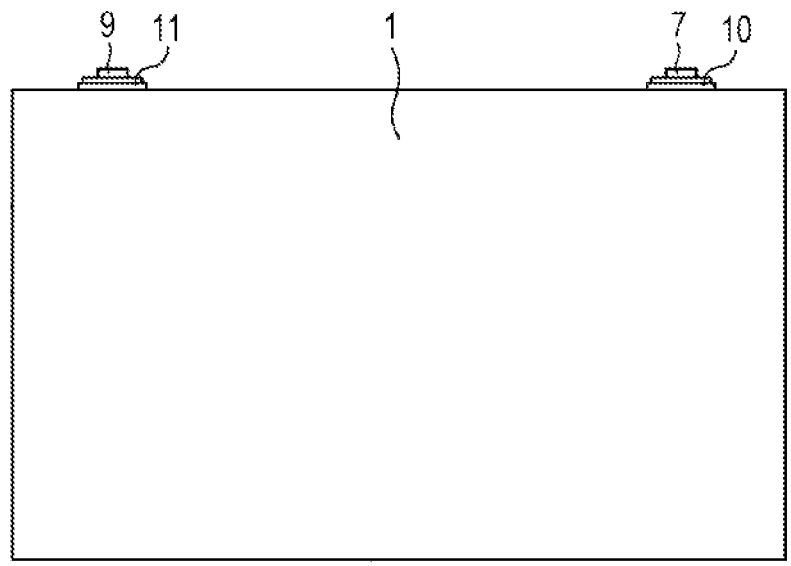
FIG. 1B is a side view of the prismatic secondary battery according to the embodiment.
Figure 2A:
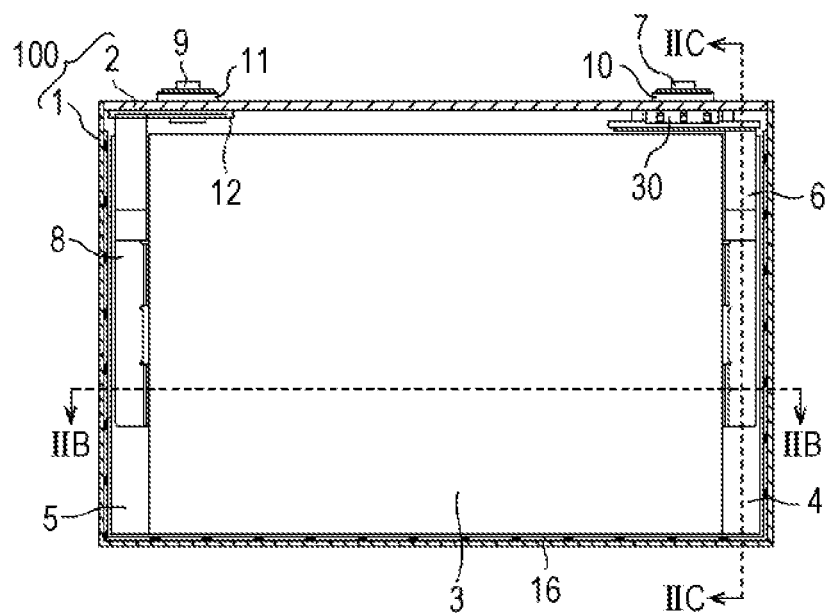
FIG. 2A is a cross-sectional view taken along line IIA-IIA in FIG. 1A.
Figure 2C:
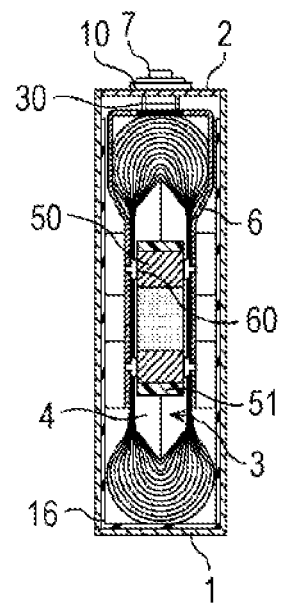
FIG. 2C is a cross-sectional view taken along line IIC-IIC in FIG. 2A.
Figure 2B:
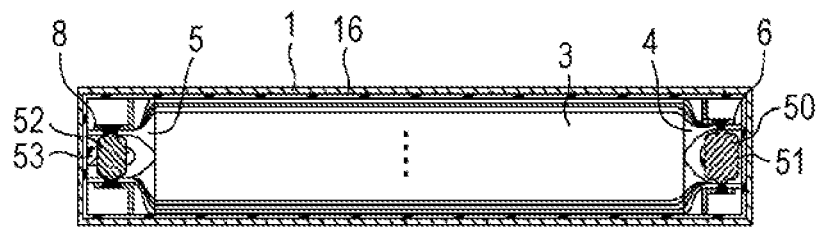
FIG. 2B is a cross-sectional view taken along line IIB-IIB in FIG. 2A.

The structure of a prismatic secondary battery 20, which is a secondary battery according to an embodiment, will be described below. The present invention is not limited to the following embodiment.

As illustrated in FIG. 1A, FIG. 1B, and FIGS. 2A to 2C, the prismatic secondary battery 20 has a battery case 100. The battery case 100 includes a bottomed cylindrical prismatic outer body 1 having an opening, and a sealing plate 2 that seals the opening of the prismatic outer body 1. The prismatic outer body 1 and the sealing plate 2 are preferably each made of metal, and preferably made of, for example, aluminum or an aluminum alloy. The prismatic outer body 1 contains, together with an electrolyte, a flat electrode body 3 including a positive electrode plate and a negative electrode plate that are wound with a separator interposed therebetween.

The electrode body 3 has a wound positive electrode core-exposed portion 4 at one end and a wound negative electrode core-exposed portion 5 at the other end. A positive electrode current collector 6 is connected to the positive electrode core-exposed portion 4. The positive electrode current collector 6 is electrically connected to a positive electrode terminal 7 attached to the sealing plate 2. A negative electrode current collector 8 is connected to the negative electrode core-exposed portion 5. The negative electrode current collector 8 is electrically connected to a negative electrode terminal 9 attached to the sealing plate 2. The positive electrode current collector 6, the positive electrode terminal 7, the negative electrode current collector 8, and the negative electrode terminal 9 are each made of metal.

A first insulating member 10 made of resin is disposed between the positive electrode terminal 7 and the sealing plate 2. A first insulating member 11 made of resin is disposed between the negative electrode terminal 9 and the sealing plate 2. An internal insulating member 12 made of resin is disposed between the sealing plate 2 and the negative electrode current collector 8.

The sealing plate 2 has an electrolyte injection port 13. The electrolyte injection port 13 is sealed with a sealing member 14. The sealing plate 2 has a gas release valve 15. The gas release valve 15 fractures upon an increase in the internal pressure of the battery case 100 to a predetermined value or higher and releases gas from the battery case 100 to the outside of the battery case 100.

An insulating sheet 16 made of resin is disposed between the prismatic outer body 1 and the electrode body 3. The insulating sheet 16 is formed in a bag shape or a box shape and contains the electrode body 3 inside.

The conduction path between the positive electrode plate and the positive electrode terminal 7 is provided with a current interrupting mechanism 30. The current interrupting mechanism 30 operates when an abnormal event occurs in the prismatic secondary battery 20 to increase the internal pressure of the battery case 100 to a predetermined value or higher. The operation of the current interrupting mechanism 30 causes disconnection of the conduction path between the positive electrode plate and the positive electrode terminal 7. The operating pressure of the current interrupting mechanism 30 is lower than the operating pressure of the gas release valve 15. The current interrupting mechanism 30 may be provided in the conduction path between the negative electrode plate and the negative electrode terminal 9.

The wound positive electrode core-exposed portion 4 is divided into two sections from the central part, and intermediate conductive members 50 made of metal are disposed between these two sections. Two intermediate conductive members 50 are held by holding members 51 made of resin. Welds 60 are formed at the connection parts between the positive electrode current collector 6, the positive electrode core-exposed portion 4, and the intermediate conductive members 50.

The wound negative electrode core-exposed portion 5 is divided into two sections from the central part, and the intermediate conductive members 52 made of metal are disposed between these two sections. Two intermediate conductive members 52 are held by holding members 53 made of resin. Welds (not illustrated) are formed at the connection parts between the negative electrode current collector 8, the negative electrode core-exposed portion 5, and the intermediate conductive members 52.

Next, a method for producing the prismatic secondary battery 20, and the components of the prismatic secondary battery 20 will be described below in detail.

Positive Electrode Plate

A positive electrode active material mixture layer containing a positive electrode active material is formed on each surface of a positive electrode core made of metal foil to provide a strip-shaped positive electrode plate. The positive electrode plate has a positive electrode core-exposed portion 4 in an edge part in the width direction. The positive electrode core-exposed portion 4 has no positive electrode active material mixture layer on each surface and extends in the longitudinal direction of the positive electrode plate. The positive electrode core is preferably made of, for example, aluminum foil or aluminum alloy foil. The positive electrode active material is preferably a lithium-transition metal composite oxide. The positive electrode active material mixture layer preferably contains a binder, such as polyvinylidene fluoride, and a conductive agent composed of a carbon material and other materials.

Negative Electrode Plate

A negative electrode active material mixture layer containing a negative electrode active material is formed on each surface of a negative electrode core made of metal foil to provide a strip-shaped negative electrode plate. The negative electrode plate has a negative electrode core-exposed portion 5 in an edge part in the width direction. The negative electrode core-exposed portion 5 has no negative electrode active material mixture layer on each surface and extends in the longitudinal direction of the negative electrode plate. The negative electrode core is preferably made of, for example, copper foil or copper alloy foil. The negative electrode active material is preferably, for example, a carbon material or a silicon material. The negative electrode active material mixture layer preferably contains a binder, such as carboxymethylcellulose (CMC) or styrene-butadiene rubber (SBR).

Electrode Body

The strip-shaped positive electrode plate and the strip-shaped negative electrode plate are wound with a strip-shaped separator interposed therebetween, and formed in a flat shape to provide a flat electrode body 3. In the electrode body 3, the wound positive electrode core-exposed portion 4 is disposed in one edge part in the direction in which the winding axis extends, and the wound negative electrode core-exposed portion 5 is disposed in the other edge part. The separator is preferably a fine porous membrane. The separator is preferably a polyolefin separator.

Current Interrupting Mechanism

Figure 3:
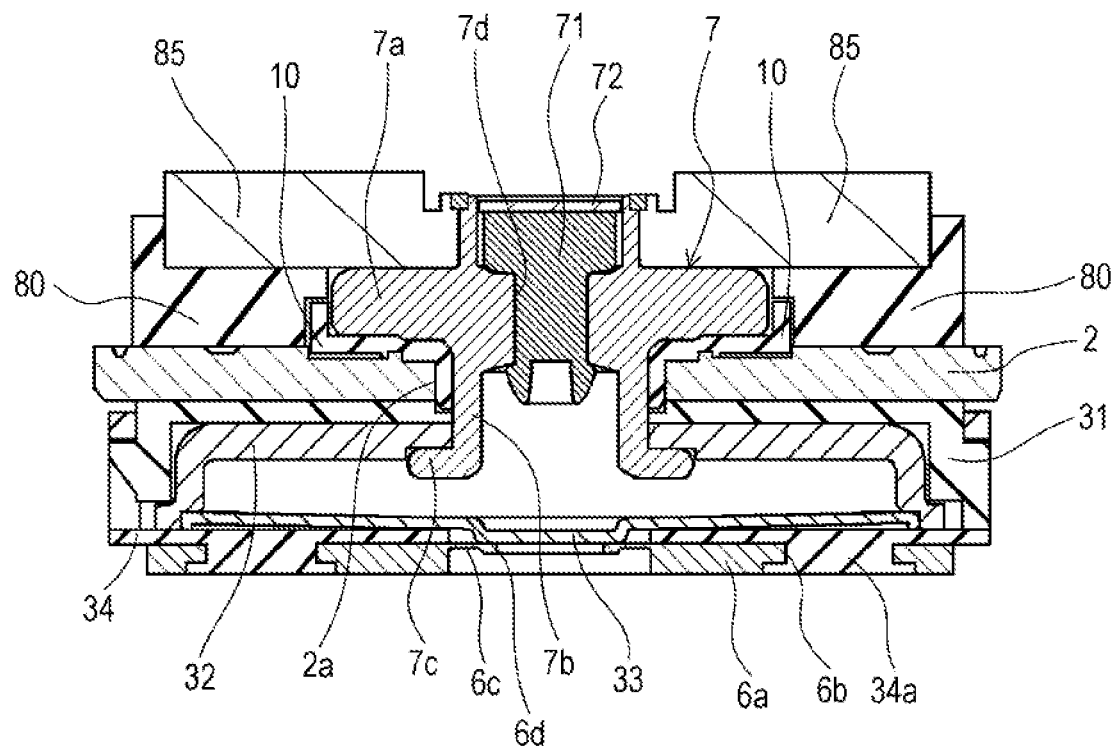
FIG. 3 is a cross-sectional view of a current interrupting mechanism and the surrounding area in the transverse direction of the sealing plate.
Figure 4:
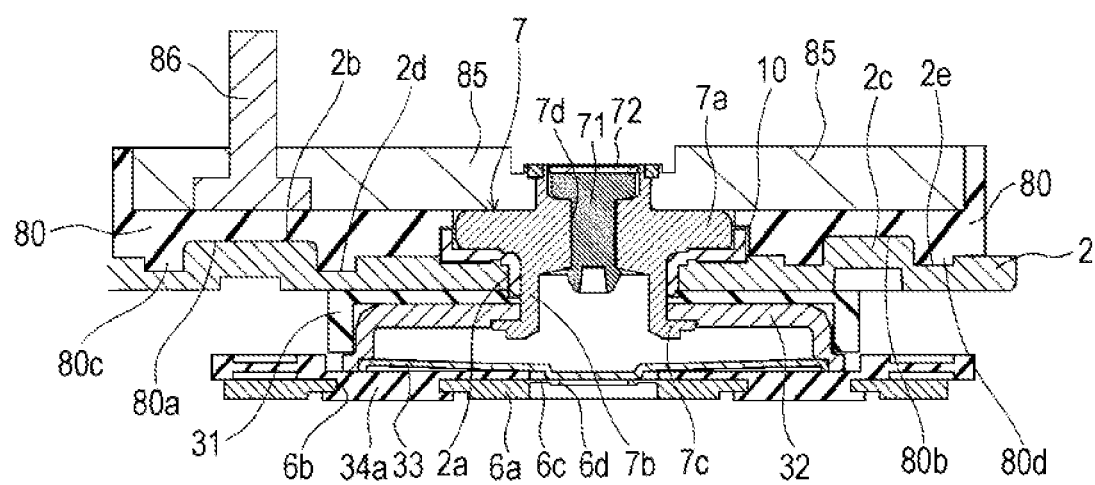
FIG. 4 is a cross-sectional view of the current interrupting mechanism and the surrounding area in the longitudinal direction of the sealing plate.

Referring to FIG. 3 and FIG. 4, a method for attaching the positive electrode terminal 7 to the sealing plate 2, a method for producing the current interrupting mechanism 30, and the structure of the current interrupting mechanism 30 will be described.

The first insulating member 10 is disposed on the battery outer side around the positive electrode terminal attachment hole 2a of the sealing plate 2. A third insulating member 31 and a conductive member 32 are disposed on the battery inner side around the positive electrode terminal attachment hole 2a of the sealing plate 2. The positive electrode terminal 7 is inserted from the battery outer side into the through-hole of the first insulating member 10, the positive electrode terminal attachment hole 2a, the through-hole of the third insulating member 31, and the through-hole of the conductive member 32. The end of the positive electrode terminal 7 is crimped onto the conductive member 32. The positive electrode terminal 7, the first insulating member 10, the third insulating member 31, and the conductive member 32 are thus fixed to the sealing plate 2. The positive electrode terminal 7 has a flange part 7a, an insertion part 7b, and a crimped part 7c. The flange part 7a is disposed on the battery outer side with respect to the sealing plate 2. The insertion part 7b extends from the flange part 7a to the battery inner side. The crimped part 7c is formed on the end side of the insertion part 7b. The crimped part 7c is preferably welded to the conductive member 32. The third insulating member 31 is a resin member. The sealing plate 2 is electrically insulated from the positive electrode terminal 7 and the conductive member 32 by the first insulating member 10 and the third insulating member 31.

The conductive member 32 is made of metal and has a cup shape. The conductive member 32 has a region parallel to the sealing plate 2, and a cylindrical region. The cylindrical region has an opening adjacent to the electrode body 3. The cross-sectional shape of the cylindrical region in the direction parallel to the sealing plate 2 may be circular or rectangular.

The positive electrode terminal 7 has a terminal through-hole 7d. The leak inspection of each connection part can be carried out by flowing gas from the terminal through-hole 7d into the current interrupting mechanism 30. The terminal through-hole 7d is sealed with a rubber member 71. The outer surface of the rubber member 71 is preferably provided with a metal plate 72.

The opening of the conductive member 32 adjacent to the electrode body 3 is sealed with a deformation plate 33 made of metal. A positive electrode current collector 6 is connected to the surface of the deformation plate 33 adjacent to the electrode body 3. A fourth insulating member 34 made of resin is disposed between the deformation plate 33 and the positive electrode current collector 6. The fourth insulating member 34 is preferably connected to the third insulating member 31.

The positive electrode current collector 6 has a base part 6a located between the sealing plate 2 and the electrode body 3. The base part 6a has a fixation opening 6b. A fixation protrusion 34a of the fourth insulating member 34 is inserted into the fixation opening 6b. The diameter of the end of the fixation protrusion 34a is enlarged by hot crimping or the like, so that the fourth insulating member 34 is fixed to the base part 6a of the positive electrode current collector 6.

The base part 6a of the positive electrode current collector 6 has a thin portion 6c. The thin portion 6c has a current collector opening 6d at its center. The positive electrode current collector 6 is weld-connected to the deformation plate 33 at the periphery of the current collector opening 6d.

When the internal pressure of the battery case 100 reaches a predetermined value or higher, the deformation plate 33 deforms such that the central part of the deformation plate 33 comes close to the positive electrode terminal 7. The deformation of the deformation plate 33 causes the thin portion 6*c* of the positive electrode current collector 6 to fracture and thus disconnects the conduction path between the positive electrode plate and the positive electrode terminal 7. Preferably, the thin portion 6*c* has an annular notch and fractures at the annular notch.

Attachment of Negative Electrode Terminal to Sealing Plate

The first insulating member 11 is disposed on the battery outer side around the negative electrode terminal attachment hole of the sealing plate 2. The internal insulating member 12 and the negative electrode current collector 8 are disposed on the battery inner side around the negative electrode terminal attachment hole of the sealing plate 2. The negative electrode terminal 9 is then inserted from the battery outer side into the through-hole of the first insulating member 11, the negative electrode terminal attachment hole, the through-hole of the internal insulating member 12, and the through-hole of the negative electrode current collector 8. The end of the negative electrode terminal 9 is crimped onto the negative electrode current collector 8. The negative electrode terminal 9, the first insulating member 11, the internal insulating member 12, and the negative electrode current collector 8 are fixed to the sealing plate 2. The crimped part of the negative electrode terminal 9 is preferably welded to the negative electrode current collector 8.

Attachment of Electrode Body to Current Collector

The positive electrode current collector 6 is welded to each outer surface of the wound positive electrode core-exposed portion 4. The negative electrode current collector 8 is welded to each outer surface of the wound negative electrode core-exposed portion 5.

Assembly of Prismatic Secondary Battery

The electrode body 3 is covered with the insulating sheet 16 that has been bent and formed into a box shape. The electrode body 3 is then inserted into the prismatic outer body 1. The sealing plate 2 is welded to the prismatic outer body 1 such that the opening of the prismatic outer body 1 is closed with the sealing plate 2. An electrolyte is then injected into the battery case 100 through the electrolyte injection port 13 of the sealing plate 2. The electrolyte injection port 13 is then sealed with the sealing member 14 composed of a blind rivet or the like. The prismatic secondary battery 20 is produced in this way.

Attachment of Second Insulating Member and External Conductive Member

As illustrated in FIG. 3 and FIG. 4, an external conductive member 85 is disposed on the sealing plate 2 with the second insulating member 80 interposed therebetween. The external conductive member 85 is connected to a portion of the positive electrode terminal 7 located on the battery outer side with respect to the sealing plate 2. The external conductive member 85 is made of metal. The external conductive member 85 is preferably made of aluminum or an aluminum alloy. Preferably, the external conductive member 85 has a through-hole, the positive electrode terminal 7 is disposed inside the through-hole, and the external conductive member 85 and the positive electrode terminal 7 are weld-connected to each other. The positive electrode terminal 7 may be crimped onto the external conductive member 85. The external conductive member 85 is disposed on a flange part 7*a* of the positive electrode terminal 7. A bolt 86 made of meal is connected to the external conductive member 85.

The second insulating member 80 is preferably fitted to the sealing plate 2.

As illustrated in FIG. 1A and FIG. 4, the sealing plate 2 has a first protrusion 2*b* and a second protrusion 2*c* on the battery outer surface. The second insulating member 80 has an insulating member first recess 80*a* and an insulating member second recess 80*b*. The first protrusion 2*b* is located inside the insulating member first recess 80*a*, and the second protrusion 2*c* is located inside the insulating member first recess 80*a*.

The sealing plate 2 has an annular first recess 2*d* around the first protrusion 2*b* and has an annular second recess 2*e* around the second protrusion 2*c*. Preferably, the annular insulating member first protrusion 80*c* of the second insulating member 80 is located inside the first recess 2*d*, and an annular insulating member second protrusion 80*d* of the second insulating member 80 is located inside the second recess 2*e*.

Alternatively, the sealing plate 2 may have a recess, and a protrusion on the second insulating member 80 may be fitted to the recess. In this case, the recess may be, for example, a linear recess that extends in the longitudinal direction of the sealing plate 2. The sealing plate 2 may have a plurality of the recesses. For example, the sealing plate 2 may have two recesses arranged in parallel or may have four recesses arranged in parallel. The recess of the sealing plate 2 may be in a dotted form, an annular form, or other form.

An external conductive member 88 is connected to a portion of the negative electrode terminal 9 located on the battery outer side with respect to the sealing plate 2. A second insulating member 81 is disposed between the external conductive member 88 and the sealing plate 2. The external conductive member 88 is made of metal. The external conductive member 88 is preferably made of aluminum or an aluminum alloy. In the case where the negative electrode terminal 9 is made of copper or a copper alloy, a region of the external conductive member 88 connected to the negative electrode terminal 9 can be made of copper or a copper alloy, and a portion of the external conductive member 88 connected to the bolt 86 can be made of aluminum or an aluminum alloy. The negative electrode terminal 9 may have a portion made of copper or a copper alloy and a portion made of aluminum or an aluminum alloy. In this case, the external conductive member 88 made of aluminum or an aluminum alloy is preferably connected to the portion of the negative electrode terminal 9 made of aluminum or an aluminum alloy. The negative electrode current collector 8 made of copper or a copper alloy is preferably connected to the portion of the negative electrode terminal 9 made of copper or a copper alloy. The sealing plate 2 has a third protrusion 2*f* and a fourth protrusion 2*g* on the battery outer surface. The sealing plate 2 has a third recess 2*h* around the third protrusion 2*f* and has a fourth recess 2*i* around the fourth protrusion 2*g*. The second insulating member 81 is preferably fitted to the sealing plate 2.

In the prismatic secondary battery 20 according to the embodiment, the thermal resistance of the second insulating member 80 is higher than the thermal resistance of the first insulating member 10 made of resin on the positive electrode terminal 7 side, while the thermal resistance of the second insulating member 81 is higher than the thermal resistance of the first insulating member 11 made of resin on the negative electrode terminal 9 side. However, the thermal resistance of the second insulating member is not necessarily higher than the thermal resistance of the first insulating member made of resin on both the positive electrode terminal 7 side and the negative electrode terminal 9 side. In other words, the thermal resistance of the second insulating member is higher than the thermal resistance of the first insulating member made of resin on at least one of the positive electrode terminal 7 side and the negative electrode terminal 9 side.

Battery Pack

Figure 5:
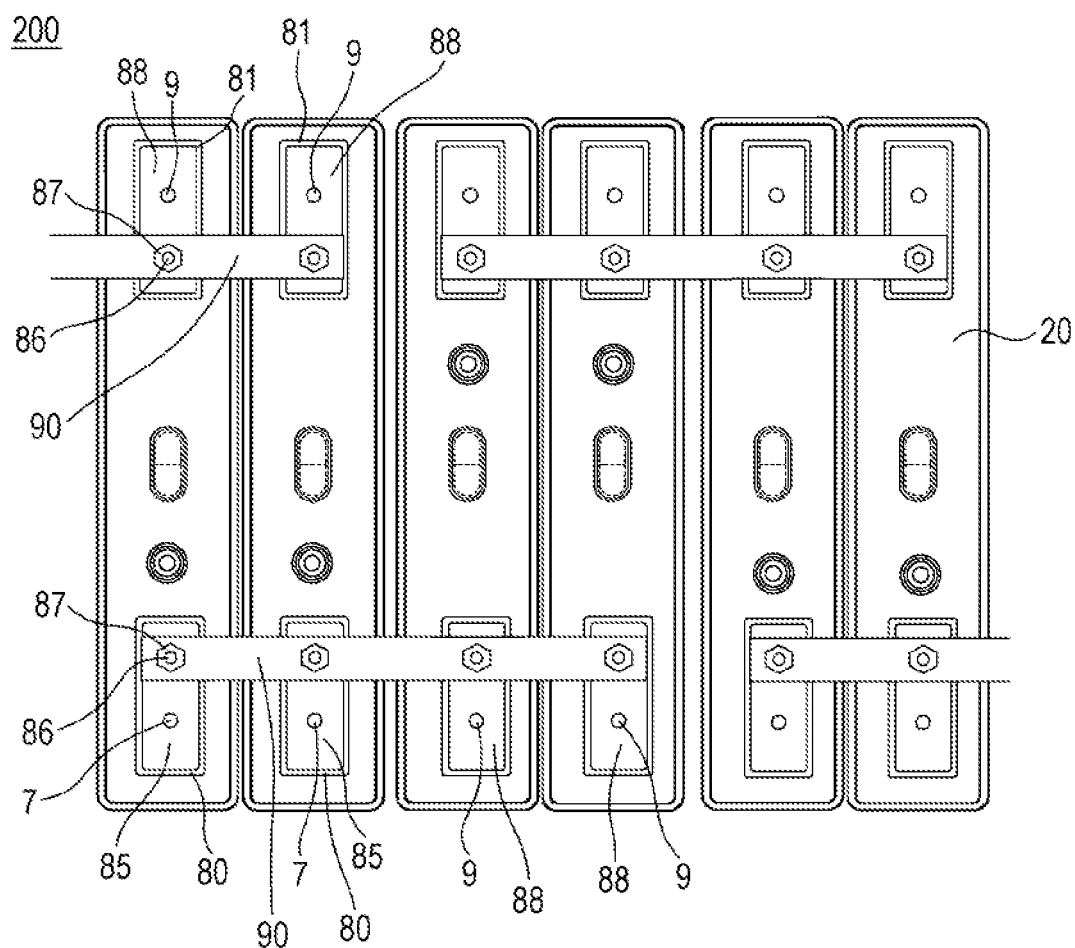
FIG. 5 is a top view of a battery pack including a plurality of the prismatic secondary batteries according to the embodiment.

A battery pack can be produced by connecting the prismatic secondary batteries 20 according to the embodiment in parallel. FIG. 5 is a top view of a battery pack 200 including two batteries in parallel×three units in series, where three units of two prismatic secondary batteries 20 connected in parallel are connected in series. A busbar 90 made of metal is fastened with the bolt 86 and a nut 87 attached to the external conductive member 85 or the external conductive member 88 of each prismatic secondary battery 20. The adjacent prismatic secondary batteries 20 are electrically connected to each other with the busbar 90. The busbar 90 is preferably made of aluminum or an aluminum alloy. As not illustrated in the figure, the battery pack 200 may have end plates at the opposed ends, and the end plates can be connected to each other with binding bars. Moreover, an insulating spacer, such as an insulating sheet, can be disposed between the adjacent prismatic secondary batteries 20. The number of the prismatic secondary batteries 20 connected in parallel can also be changed appropriately. The number of series-connected units of the prismatic secondary batteries 20 connected in parallel can also be changed appropriately. The battery pack may be composed only of the prismatic secondary batteries 20 connected in parallel.

A battery pack known in the related art may undergo the following phenomena if an internal short circuit occurs in one of the prismatic secondary batteries 20 connected in parallel.

The internal pressure of the battery case 100 of the prismatic secondary battery 20 in which an internal short circuit has occurred increases as the temperatures increases rapidly. Since the prismatic secondary batteries 20 are connected in parallel, a current flows into the prismatic secondary battery 20 in which the internal short circuit has occurred from other prismatic secondary batteries 20. Thus, the prismatic secondary batteries 20 in the case where an internal short circuit occurs in the prismatic secondary batteries 20 connected in parallel tends to reach a high temperature more rapidly and tends to reach a higher temperature than those in the case where an internal short circuit occurs in the prismatic secondary batteries 20 that are not connected in parallel.

In the prismatic secondary battery 20 in which the internal short circuit has occurred, the current interrupting mechanism 30 operates in response to an increase in the internal pressure of the battery case 100. The operation of the current interrupting mechanism 30 causes disconnection of the conduction path between the positive electrode plate and the positive electrode terminal 7 and thus terminates the current flow from other prismatic secondary batteries 20 into the prismatic secondary battery 20 in which the internal short circuit has occurred.

However, there is a case where the prismatic secondary battery 20 in which an internal short circuit has occurred reaches a very high temperature. In this case, the high temperature may lead to melting of the first insulating member 10 made of resin, which insulates between the positive electrode terminal 7 and the sealing plate 2, and the first insulating member 11 made of resin, which insulates between the negative electrode terminal 9 and the sealing plate 2. If the first insulating member 10 and the first insulating member 11 melt, the positive electrode terminal 7 and the negative electrode terminal 9 both come into contact with the sealing plate 2. This forms a conduction path of positive electrode terminal 7-sealing plate 2-negative electrode terminal 9 and thus forms a closed circuit in the prismatic secondary batteries 20 connected in parallel. As a result, a large current may flow again into the prismatic secondary batteries 20 connected in parallel, and an abnormal event may occur in prismatic secondary batteries 20 different from the prismatic secondary battery 20 in which a short circuit has occurred.

In the prismatic secondary battery 20 according to the embodiment, the second insulating member 80 having higher thermal resistance than the first insulating member 10 is disposed between the sealing plate 2 and the external conductive member 85 connected to the positive electrode terminal 7. Therefore, even if the prismatic secondary battery 20 becomes a high-temperature state so that the first insulating member 10 melts, the second insulating member 80 keeps the external conductive member 85 and the sealing plate 2 distant from each other. The positive electrode terminal 7 connected to the external conductive member 85 is thus unlikely to move toward the sealing plate 2. This can avoid electrical connection between the positive electrode terminal 7 and the sealing plate 2. Therefore, even if an internal short circuit occurs in the prismatic secondary batteries 20 connected in parallel as described above, a conduction path is formed separately after operation of the current interrupting mechanism 30. This can avoid the flow of a large current into other prismatic secondary batteries 20.

In the case where the first insulating member 10 disposed between the positive electrode terminal 7 and the sealing plate 2 and the second insulating member 80 disposed between the external conductive member 85 and the sealing plate 2 are separate members, the above-described issue can be solved with a simple method while the airtightness of the prismatic secondary battery 20 can be effectively avoided from decreasing.

The second insulating member is preferably a member having higher thermal resistance than the first insulating member.

For example, the second insulating member may have a higher melting point than the first insulating member. The second insulating member is preferably a liquid crystal polymer. The liquid crystal polymer may have a structure based on p-hydroxybenzoic acid, 6-hydroxy-2-naphthoic acid, or the like. The liquid crystal polymer may contain a ceramic fiber or ceramic particles. Examples of suitable ceramics include alumina, zirconia, titania, silica, and glass.

Alternatively, the second insulating member may be a ceramic member made of, for example, alumina, zirconia, titania, silica, or glass.

Alternatively, the second insulating member may be a resin member containing a ceramic filler, such as glass fiber. The resin may be, for example, a thermosetting resin, such as a polyphenylene sulfide (PPS) resin or a phenolic resin.

The first insulating member is preferably made of, for example, polypropylene (PP), polyethylene (PE), polyphenylene sulfide (PPS), tetrafluoroethylene (PTFE), tetrafluoroethylene-perfluoroalkyl vinyl ether copolymer (PFA), or tetrafluoroethylene-ethylene copolymer (ETFE). This material can ensure sealing between the sealing plate and the terminal.

The prismatic secondary battery 20 according to the embodiment is an example in which the pressure-sensitive current interrupting mechanism 30 is provided between the positive electrode plate and the positive electrode terminal 7.

However, the pressure-sensitive current interrupting mechanism 30 is not an essential element. The pressure-sensitive current interrupting mechanism 30 may be replaced by a fuse part.

This embodiment illustrates an example in which the bolt is attached to the external conductive member. The busbar may be weld-connected to the external conductive member, without attaching the bolt to the external conductive member. Alternatively, the busbar may be used as an external conductive member, and the busbar may be directly welded to the terminal.

The prismatic secondary battery 20 according to the embodiment is an example in which the terminal is inserted from the battery outer side of the sealing plate and crimped on the battery inner side. The terminal may be inserted from the battery inner side of the sealing plate and crimped onto the external conductive member on the battery outer side.

Modification 1

Figure 6:
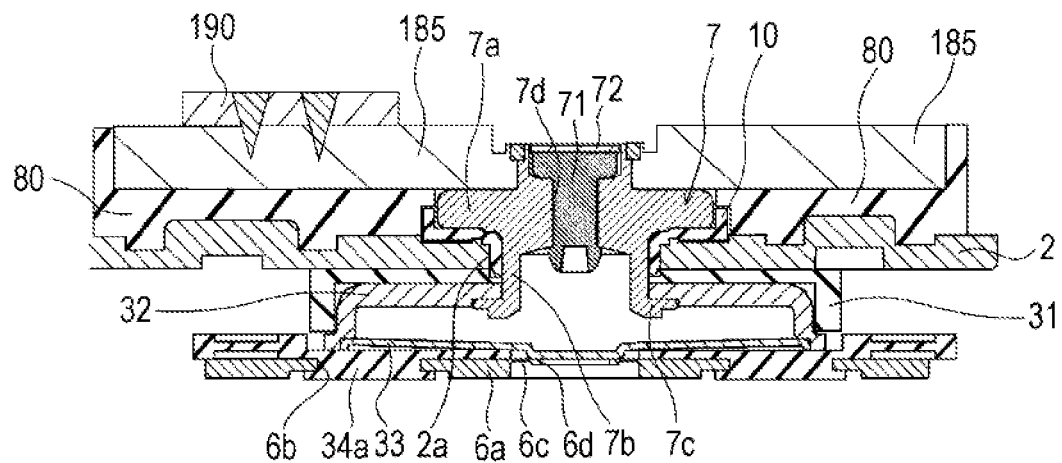
FIG. 6 is a view corresponding to FIG. 4 for a prismatic secondary battery according to Modification 1.

As illustrated in FIG. 6, in a prismatic secondary battery according to Modification 1, no bolt is attached to an external conductive member 185 connected to a positive electrode terminal 7. A busbar 190 is directly weld-connected to the external conductive member 185. Preferably, a busbar 190 is also directly weld-connected to an external conductive member connected to a negative electrode terminal 9.

Modification 2

Figure 7:
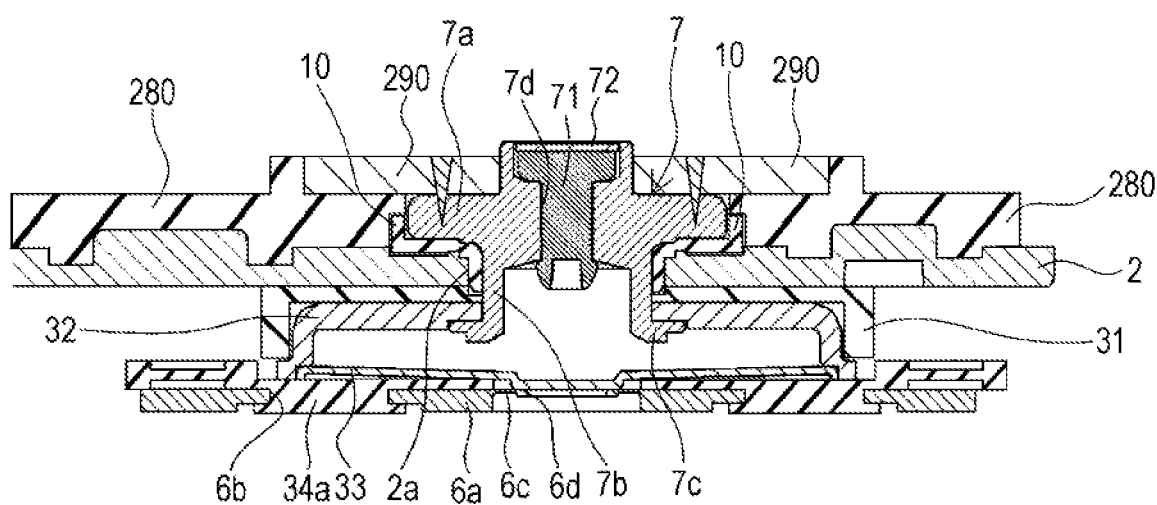
FIG. 7 is a view corresponding to FIG. 4 for a prismatic secondary battery according to Modification 2.

As illustrated in FIG. 7, in a prismatic secondary battery according to Modification 2, a busbar 290 is directly connected to a positive electrode terminal 7. The busbar 290 is directly welded to the positive electrode terminal 7. This configuration provides a lightweight battery pack with low resistance.

A part of the positive electrode terminal 7 is inserted into the through-hole of the busbar 290. The busbar 290 is disposed on a flange part 7a of the positive electrode terminal 7.

A second insulating member 280 is disposed between the busbar 290 and the sealing plate 2. The thermal resistance of the second insulating member 280 is higher than the thermal resistance of the first insulating member 10. The second insulating member 280 is preferably fitted to the sealing plate 2.

Modification 3

A prismatic secondary battery according to Modification 3 has no current interrupting mechanism but has a positive electrode current collector 106 including a fuse part 106x.

Figure 8:
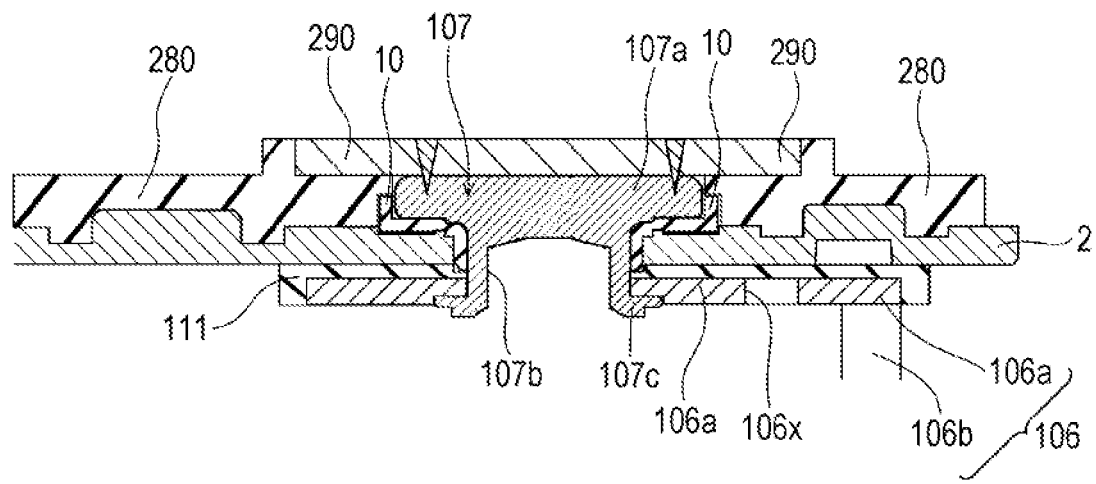
FIG. 8 is a view corresponding to FIG. 4 for a prismatic secondary battery according to Modification 3.

As illustrated in FIG. 8, a first insulating member 10 is disposed on the battery outer side around a positive electrode terminal attachment hole 2a of a sealing plate 2. An internal insulating member 111 and a base part 106a of a positive electrode current collector 106 are disposed on the battery inner side around the positive electrode terminal attachment hole 2a of the sealing plate 2. The first insulating member 10 and the internal insulating member 111 are each made of resin. The positive electrode terminal 107 has a flange part 107a and an insertion part 107b. The flange part 107a is located on the battery outer side with respect to the sealing plate 2. The insertion part 107b extends from the flange part 107a to the battery inner side. The insertion part 107b is inserted from the battery outer side into the through-hole of the first insulating member 10, the positive electrode terminal attachment hole 2a, the through-hole of the internal insulating member 111, and the through-hole of the base part 106a of the positive electrode current collector 106. The edge of the insertion part 107b is then crimped. As a result, a crimped part 107c is formed in the insertion part 107b. The crimped part 107c is preferably welded to a base part 106a.

The positive electrode current collector 106 has a lead part 106b, which extends from the base part 106a toward the electrode body 3 and is connected to a positive electrode core-exposed portion 4. The positive electrode current collector 106 has the fuse part 106x. The fuse part 106x can be formed by providing the positive electrode current collector 106 with, for example, an opening, a cutout, or a thin portion, that is, a part having a smaller cross-sectional area than other parts.

If an internal short circuit occurs in one prismatic secondary battery in a battery pack including prismatic secondary batteries connected in parallel, a current flows into the prismatic secondary battery in which the internal short circuit has occurred from other prismatic secondary batteries, and the fuse part 106x melts and breaks. However, there is a possibility that the prismatic secondary battery in which the internal short circuit has occurred becomes a high-temperature state, and the first insulating member 10 on the positive electrode side and a first insulating member 11 on the negative electrode side melt to form a conduction path of positive electrode terminal-sealing plate-negative electrode terminal.

In a prismatic secondary battery according to Modification 3, a second insulating member 280 having higher thermal resistance than a first insulating member 10 is disposed between the sealing plate 2 and a busbar 290 connected to the positive electrode terminal 107. Even if the prismatic secondary battery becomes a high-temperature state, the second insulating member thus keeps the distance between the busbar 290 and the sealing plate 2. Therefore, even if the first insulating member 10 melts, the positive electrode terminal 107 connected to the busbar 290 is unlikely to move toward the sealing plate 2. This can avoid electrical connection between the positive electrode terminal 107 and the sealing plate 2.

Modification 4

Figure 9:
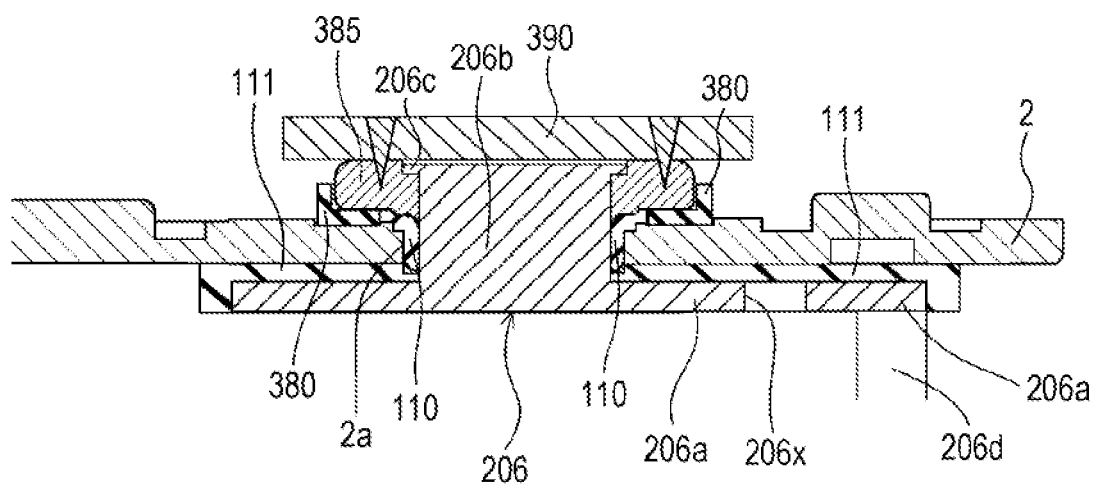
FIG. 9 is a view corresponding to FIG. 4 for a prismatic secondary battery according to Modification 4.

FIG. 9 is a view corresponding to FIG. 4 for a prismatic secondary battery according to Modification 4.

The positive electrode current collector 206 includes a base part 206a and an insertion part 206b. The base part 206a is located between the sealing plate 2 and an electrode body 3. The insertion part 206b extends from the base part 206a to the battery outer side. The positive electrode current collector 206 has a lead part 206d, which extends from the base part 206a toward the electrode body 3 and is connected to a positive electrode core-exposed portion 4. The base part 206a has a fuse part 206x. The insertion part 206b of the positive electrode current collector 206 functions as a positive electrode terminal. A first insulating member 110 made of resin is disposed between the insertion part 206b and the sealing plate 2. The interface between the sealing plate 2 and the insertion part 206b is sealed with the first insulating member 110. A second insulating member 380 is disposed on the battery outer surface of the sealing plate 2. An external conductive member 385 is disposed on the second insulating member 380. The insertion part 206b of the positive electrode current collector 206 is inserted into the through-hole of the external conductive member 385 and crimped onto the external conductive member 385. As a result, a crimped part 206c is formed. A busbar 390 is weld-connected to the external conductive member 385.

In a battery pack including the prismatic secondary batteries according to Modification 4 connected in parallel, the second insulating member 380 keeps the distance between the external conductive member 385 and the sealing plate 2 even if the prismatic secondary battery becomes a high-temperature state so that the first insulating member 110 melts. Thus, the insertion part 206b, which serves as a positive electrode terminal connected to the external conductive member 385, is unlikely to move toward the sealing plate 2. This can avoid electrical connection between the sealing plate 2 and the insertion part 206b, which serves as a positive electrode terminal.

Modification 5

A prismatic secondary battery according to Modification 5 differs from the prismatic secondary battery according to Modification 4 in the configurations of a first insulating member, a second insulating member, and a busbar.

Figure 10:
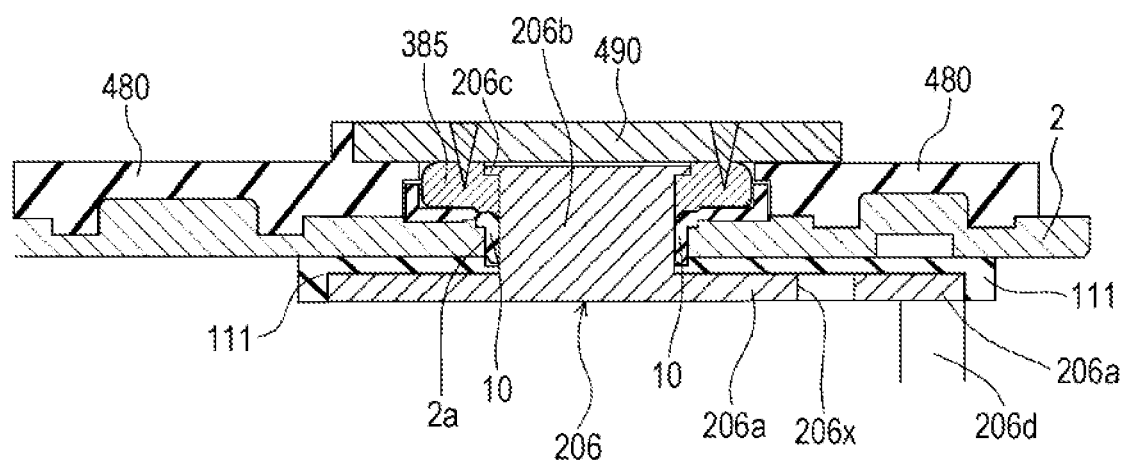
FIG. 10 is a view corresponding to FIG. 4 for a prismatic secondary battery according to Modification 5.

As illustrated in FIG. 10, the prismatic secondary battery according to Modification 5 includes a second insulating member 480 between a busbar 490 and a sealing plate 2. The second insulating member 480 is fitted to the sealing plate 2. A first insulating member 10 is disposed between the sealing plate 2 and an insertion part 206b, which serves as a positive electrode terminal. The thermal resistance of the second insulating member 480 is higher than the thermal resistance of a first insulating member 10.

In a battery pack including the prismatic secondary batteries according to Modification 5 connected in parallel, the second insulating member 480 keeps the distance between the busbar 490 and the sealing plate 2 even if the prismatic secondary battery becomes a high-temperature state so that the first insulating member 10 melts. Thus, the insertion part 206b, which serves as a positive electrode terminal connected to the busbar 490 through the external conductive member 385, is unlikely to move toward the sealing plate 2. This can avoid electrical connection between the sealing plate 2 and the insertion part 206b, which serves as a positive electrode terminal.

Others

Modifications 1 to 5 illustrate examples in which the thermal resistance of the second insulating member is higher than the thermal resistance of the first insulating member on the positive electrode terminal side. However, the thermal resistance of the second insulating member may be higher than the thermal resistance of the first insulating member on the negative electrode terminal side. The thermal resistance of the second insulating member is higher than the thermal resistance of the first insulating member on at least one of the positive electrode terminal side and the negative electrode terminal side.

The embodiment and Modifications 1 to 5 illustrate examples in which the positive electrode terminal and the negative electrode terminal are electrically insulated from the sealing plate. However, at least one of the positive electrode terminal and the negative electrode terminal may be electrically connected to the sealing plate.

The components that are not described in Modifications 1 to 5 may be the same as those in the prismatic secondary battery 20 according to the embodiment.

The structure of the electrode body is not limited. The electrode body may be an electrode body including a strip-shaped positive electrode plate and a strip-shaped negative electrode plate that are wound with a strip-shaped separator interposed therebetween. The electrode body may be a stacked electrode body including positive electrode plates and negative electrode plates that are stacked with separators each interposed therebetween. A plurality of electrode bodies may be placed in the battery case.

The secondary battery according to the present invention can be used in a battery pack including secondary batteries all connected in series. However, the secondary battery according to the present invention is very effective when used in a battery pack in which at least two secondary batteries are connected in parallel.

The secondary battery is preferably a non-aqueous electrolyte secondary battery and more preferably a lithium-ion secondary battery. The positive electrode plate, the negative electrode plate, the separator, the electrolyte, and the like may be composed of known materials.

The melting point of the second insulating member is preferably 250° C. or more, more preferably 280° C. or more, and still more preferably 300° C. or more.

The deflection temperature under load of the second insulating member is preferably higher than the deflection temperature under load of the first insulating member. The deflection temperature under load of the second insulating member is preferably 250° C. or more, more preferably 280° C. or more, and still more preferably 300° C. or more.

The second insulating member may be a high melting point resin, such as liquid crystal polymer (LCP), polyether ether ketone (PEEK), polyphenylene sulfide (PPS), polyimide (PI), polyetherimide (PEI), or polyether sulfone (PES). Such a resin may contain a ceramic fiber or ceramic particles. Alternatively, a ceramic member may be disposed in such a resin.

The third insulating member disposed between the sealing plate and the conductive member included in the current interrupting mechanism may be integrated with the first insulating member to form one component. The internal insulating member disposed between the sealing plate and the current collector may be integrated with the first insulating member to form one component.

The thermal resistance of the third insulating member disposed between the sealing plate and the conductive member included in the current interrupting mechanism may be higher than the thermal resistance of the first insulating member. The thermal resistance of the internal insulating member disposed between the sealing plate and the current collector may be higher than the thermal resistance of the first insulating member.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
    an electrode body that includes a positive electrode plate and a negative electrode plate;
    an outer body that has an opening and houses the electrode body;
    a sealing plate that is made of metal and seals the opening; and a terminal that is electrically connected to the positive electrode plate or the negative electrode plate,
wherein the sealing plate has a terminal attachment hole,
the terminal penetrates the terminal attachment hole,
an external conductive member is connected to a portion of the terminal located on a battery outer side with respect to the sealing plate,
a conduction path between the positive electrode plate or the negative electrode plate and the terminal is provided with at least one of a current interrupting mechanism and a fuse part,
a first insulating member made of resin is disposed between the sealing plate and the terminal,
a second insulating member having higher thermal resistance than the first insulating member is disposed between the external conductive member and the sealing plate, and
the second insulating member is fitted to the sealing plate.

2. The secondary battery according to claim 1, wherein the current interrupting mechanism is disposed, and
the current interrupting mechanism is a pressure-sensitive current interrupting mechanism that operates when an internal pressure of a battery case including the outer body and the sealing plate reaches a predetermined value or higher.

3. The secondary battery according to claim 1, wherein the second insulating member is a resin member having a higher melting point than a resin that constitutes the first insulating member.

4. The secondary battery according to claim 1, wherein the second insulating member is made of a liquid crystal polymer.

5. The secondary battery according to claim 1, wherein the second insulating member is a resin member containing a ceramic filler.

6. The secondary battery according to claim 1, wherein the second insulating member is a ceramic member.

7. The secondary battery according to claim 1, further comprising a bolt connected to the external conductive member.

8. The secondary battery according to claim 1, wherein the external conductive member is a busbar.

9. A battery pack comprising a plurality of the secondary batteries according to claim 1, wherein the plurality of secondary batteries includes at least two secondary batteries connected in parallel.

* * * * *